G. Palmer,
Double-Acting Pump,
Nº 28,599.      Patented June 5, 1860.
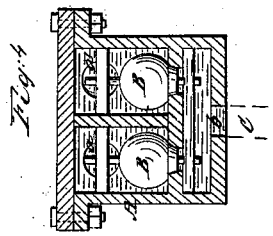
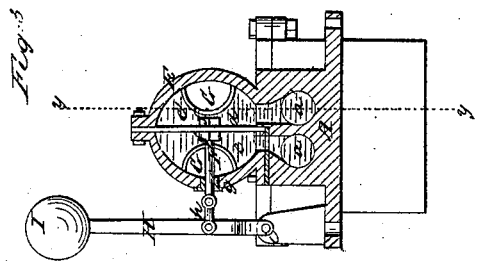
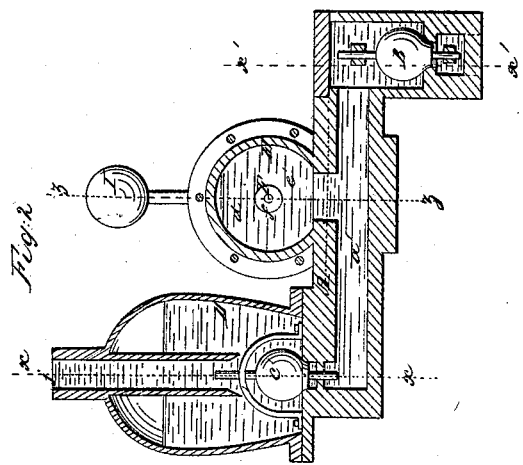
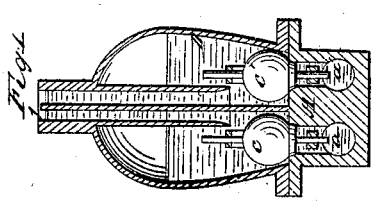
Witnesses.
J. W. Coombs
R. S. Spencer
Inventor
Geo Palmer
per Munn & Co
Attorneys

UNITED STATES PATENT OFFICE.

GEO. PALMER, OF LITTLESTOWN, PENNSYLVANIA.

PUMP.

Specification of Letters Patent No. 28,599, dated June 5, 1860.

*To all whom it may concern:*

Be it known that I, GEORGE PALMER, of Littlestown, in the county of Adams and State of Pennsylvania, have invented a new and Improved Double-Acting Pump; and I do hereby declare that the following is a full, clear, and exact description of the same, reference being had to the annexed drawings, making a part of this specification, in which—

Figure 1 is a transverse vertical section of my invention taken in the line $x$, $x$, Fig. 2; Fig. 2, a longitudinal vertical section of the same, taken in the line $y$, $y$, Fig. 3; Fig. 3, a transverse vertical section of the same taken in the line $z$, $z$, Fig. 2; Fig. 4, a transverse vertical section of the same taken in the line $x'$, $x'$, Fig 2.

Similar letters of reference indicate corresponding parts in the several figures.

The object of this invention is to facilitate the operation of the pump, render the same uniform or regular in its action and capable of being operated with a moderate application of power.

To enable those skilled in the art to fully understand and construct my invention I will proceed to describe it.

A represents the body or case of the pump, which has two openings or water passages $a$, $a'$ each of which is provided with a valve B, opening upward. These passages $a$, $a'$, communicate with a suction pipe C, at one end below the valves as shown at $b$ Fig. 4, and the opposite ends communicate with an air-vessel D which is provided with valves $c$, $c'$, one for each opening or passage $a$, $a'$, as shown in Fig. 1, the valves $c$, $c'$, opening upward.

E is a chamber of a spherical or approximate form, which is placed in the body A, and is divided by a vertical elastic diaphragm $d$ into two equal compartments $e$, $e'$, as shown clearly in Fig. 3. This diaphragm may be constructed of india-rubber or other suitable elastic material and at its center there is attached a rod F which passes horizontally and centrally through one of the sides of the chamber E, as shown clearly in Fig. 3. On this rod F, and at each side of the diaphragm $d$ there is a nut $f$. These nuts firmly secure the diaphragm to the rod F.

In each compartment $e$ $e'$ of the chamber E, and to the center of its side there is secured a semi-spherical elastic knob or projection G. These projections may be constructed of india-rubber or other suitable elastic, material and the rod F passes through one of them, and through a stuffing box $g$, in the side of the chamber E.

The valves B, B, $c$, $c'$, may be gum-ball valves provided with stems. I do not however confine myself to any particular form of valves.

The outer end of the rod F, is connected by a link $h$, to an upright lever or brake H, which has a weight I on its upper end.

The operation of the pump is as follows: The lever or brake H, is operated with an oscillating motion, by any convenient power the lever working on its fulcrum pin $i$. The lever or brake H, through the medium of the link $h$ and rod F, vibrates the diaphragm $d$ and an alternate suction and force is produced thereby in the chambers $e$, $e'$ and consequently a continuous or constant stream of water is forced from the eduction or force pipe $j$. This operation of the pump so far as the suction and force is concerned is quite old and well known and therefore does not require a minute description.

The weight I at the upper end of the lever or brake H gives a momentum to the lever, and the lever as it completes each movement compresses alternately the elastic knobs G, G, . These knobs G regulate the action of the weight I, and all combined serve not only to equalize the motion of the working parts of the pump but also greatly facilitate their operation. All concussion is avoided and unnecessary wear and tear, and if the pump is operated manually, much of the labor caused in ordinary double-acting pump by friction and an irregular application of power is avoided.

The length of the lever or brake H, as well as the size of weight I, and the size and strength of the springs G may be regulated according to the size of the pump.

I am aware that elastic diaphragms have been previously used in pumps to act in the capacity of pistons and I therefore do not claim broadly such device, neither do I claim the two water-passages, provided with valves, and arranged to throw a constant stream, but, What I do claim as my invention and desire to secure by Letters Patent, is—

The employment for united operation, of the spherical chamber E, diaphragm d, gum elastic springs G, G, pointed connecting rod F, and weighted lever H, when the same are constructed and arranged to operate in combination with an arrangement such as described, for raising and forcing water, as set forth.

GEORGE PALMER.

Witnesses:
 JOSEPH S. SHORT,
 EDWARD SHORT.